INVENTOR.
Willi Henny
BY Harness & Harris
ATTORNEYS

under optimum load, the outer periphery of the annular nozzle support proximate the hot motive gases tends to expand thermally to a greater extent than its inner periphery proximate the much cooler rotor bearing support. In consequence, circumferential expansion and radial enlargement of the hot outer periphery that would otherwise occur is restrained by the comparatively cool central portion of the support, with the result that the periphery of the support is subjected to a compressional force that deforms and shrinks the support when its outer periphery is eventually cooled. If the initial clearance between the outer shroud and the rotor periphery is at the desired minimum for optimum efficiency, after a number of such heating and cooling cycles the outer radius of the nozzle support will shrink sufficiently in some cases to cause the outer shroud supported thereby to bind the rotor. In any event with conventional structures, the extent of shrinking cannot be predetermined accurately, so that optimum operational clearance cannot be maintained for most efficient operation.

3,151,841
FIXED NOZZLE SUPPORT
Willi Henny, Canton, Ohio, assignor to Chrysler Corporation, Highland Park, Mich., a corporation of Delaware
Filed Apr. 3, 1963, Ser. No. 271,552
4 Claims. (Cl. 253—39.1)

This invention relates to gas turbine engines and in particular to improved means for supporting the fixed first stage nozzle blades which direct the hot motive gases against the first stage rotor of an automotive gas turbine engine. This application is a continuation-in-part of co-pending application Serial No. 56,269, filed September 15, 1960, now abandoned.

Although application of the present invention is not limited to use with first stage nozzle blades and may be used to support the nozzle blades of any turbine stage where the thermal and structural environment give rise to similar problems, supporting the first stage nozzle blades of an automotive gas turbine engine encounters particular problems because of the great operational temperature extremes to which the nozzle blades and their associated structures are subjected, and because of the extreme precision required in the alignment and dimensional relationship between the fixed nozzle blades and the associated rotor blades for efficient utilization of the power of the motive gases engaging the fixed blades at approximately the speed of sound.

In a conventional automotive gas turbine engine, the hot motive driving gases are conducted to the peripheral blades of the first stage rotor by an annular gas passage containing a plurality of fixed nozzles or blades immediately upstream of the rotor blades. An annular outer shroud section around the rotor blades is preferably supported at least in part by the radially outer edges of the fixed nozzles. An inner annular nozzle support is suitably connected at its outer periphery to the fixed nozzles, as for example by means of an annular inner shroud section, and is secured at its inner periphery to a fixed portion of the engine, as for example the bearing housing for the first stage rotor. In such a construction, the inner and outer shroud sections comprise parts of the inner and outer walls of said gas passage.

In order to minimize bypassing of the rotor by the motive gases, it is important to maintain the inner periphery of the annular outer shroud section as close as possible to the outer periphery scribed by the rotor blades, while maintaining operating clearance therewith as the rotor and juxtaposed shroud portions expand or contract with changing temperature conditions. In consequence of the extreme temperature range of the motive gases between idling and maximum power output conditions of the engine, difficulty has been experienced in matching the expansion of the fixed nozzle support and of the rotor so as to maintain a uniform radial spacing between the rotor and outer shroud section and between the inner and outer shroud sections at the region of the nozzles. If the nozzles and their supporting structure are caused to expand at a greater rate or to contract at a lesser rate than the corresponding expansion or contraction of the outer shroud section, the nozzles will be severely compressed against the outer shroud section resulting in damage to the nozzles or outer shroud section either by buckling of the nozzles or by embedding the latter into the material of the outer shroud section. When the operating temperature conditions change to relieve the compression force on the nozzle, a loose support for the outer shroud section will result and the latter will rub against or bind the peripheral blades of the rotor.

Also during operation of the structures known hereto-

An object of the present invention is to provide an improved supporting structure for the fixed nozzles of a gas turbine engine which avoids the foregoing problems and enables control over the thermal expansion and contraction of the supporting structure so as to minimize its permanent deformation.

Another object is to provide improvements in a gas turbine engine having a bladed rotor and inner and outer annular shroud sections defining an annular passage for conducting hot motive gases to the peripheral blades of the rotor, the outer shroud section being supported by the outer peripheral ends of a plurality of fixed flow directing nozzles arranged annularly within said passage adjacent and in advance of the rotor blades. A support for the fixed nozzles comprises a tubular heat dissipating body extending coaxially of the rotor and annularly arranged nozzles, one axial end of the tubular body being secured to said nozzle to support the same. The tubular body extends axially from said one end to a comparatively cool fixed portion of the engine shielded from the hot motive gases and is secured to said fixed portion in heat exchange or transfer relationship, thereby to transfer heat to said cool shielded portion of the engine to effect an appreciable axial thermal gradient along the heat dissipating body and to enable radial expansion and contraction of its nozzle supporting end comparatively freely without permanent deformation.

Such freedom of expansion and contraction of the nozzle supporting end of the heat dissipating body results because a solid core or disk-like mass of material of the nozzle support extending directly radially from the hot periphery to a comparatively cool central region is avoided. Instead of a radial temperature gradient between the hot outer periphery and a cool central core, the temperature gradient extends axially with the result that the tubular body will expand and contract somewhat conically in accordance with its axial temperature gradient. Within ordinarily encountered operational temperatures, there is no limit to the axial thermal gradient that can be taken by the tubular heat dissipating body. By suitably determining the latter's axial length, which can be made as long as desired in order to dissipate heat from its hot nozzle supporting end, the radial expansion and contraction of the heat dissipating body can be determined so as to match the radial expansion and contraction of the rotor and outer shroud section.

Furthermore, in order to maintain the efficiency of the gas turbine engine at motive gas speeds approximating the speed of sound, a precise dimensional and spatial relationship must be maintained between the nozzle blades and rotor blades. It is accordingly important to pilot the nozzle support accurately onto a dimensionally stable structure of the engine and to secure the nozzle support in its piloted position. Because of the extreme thermal stresses to which the nozzle support is subjected, difficulty has been encountered heretofore in maintaining the nozzles in the desired spatial relationship, particularly in a compact automotive gas turbine engine where the rotor is of comparatively small diameter to reduce inertia and enhance acceleration and where accessibility and the space available for the nozzle support is very limited. In such structures it is desirable to mount the nozzle support on the fixed bearing hub which carries the bearings for the rotor shaft and which is accordingly maintained at a comparatively cool temperature. Again because of the extreme temperature difference between the portion of the nozzle support in contact with the nozzle blades and the portion of the nozzle support mounted on the fixed bearing hub and the consequent radial stress on the latter portion, it has not been possible heretofore to provide a dimensionally stable seat or interconnection between the fixed hub and nozzle support.

It is another object of the invention to provide an improved nozzle support for a compact automotive type gas turbine engine having a rotatable air compressor and compressor driving rotor mounted on a common shaft journaled in a fixed bearing hub comprising a coaxial portion of the compressor housing, the hub and nozzle support being shielded from the hot motive gases by a wall of an annular gas passage which directs the motive gases to the rotor blades. The hub provides an annular radially extending pilot shoulder against which a mating annular flange of the nozzle support is piloted and seated in heat transfer relationship. From the flange, the nozzle support extends axially of the rotor shaft to the fixed nozzles to engage and support the same. By suitably determining the axial length of the nozzle support, a sufficiently shallow temperature gradient is achieved along its axial length between the hot nozzles and cool bearing hub, such that the thermally induced stresses at the junctures between the nozzle support and both the hot nozzles and the cool bearing hub are readily accommodated even at maximum engine load without warping the nozzles out of their desired predetermined alignment and without causing the nozzle support flange to be deformed out of its desired piloted alignment on the bearing hub. Also the axial length of the nozzle support predetermines the resistance to axial heat flow therein from the hot nozzle blades to the cool bearing hub, so that the temperature of the nozzle support flange will be maintained at the order of magnitude of the temperature of the bearing hub. The differential in thermal expansion between the bearing hub and nozzle support flange will thus not be sufficient to distort the latter's piloted seat and a comparatively fixed mounting for the nozzle support is assured.

Another and more specific object is to provide such an arrangement wherein the bearing hub for the common axial shaft for the compressor and rotor extends centrally into a spirally formed vortex chamber which collects the hot combustion products from the combustion chamber of the engine and directs these gases into the aforesaid annular gas passage to the rotor to drive the same. An inner wall of the vortex chamber comprises the shield between the hot motive gases and both the bearing hub and nozzle support.

Another object is to provide a nozzle support of the above character having a tubular heat dissipating body in combination with means for supplying fluid coolant to the heat dissipating body to facilitate control of the latter's axial temperature gradient.

Other and more specific objects are to provide such a structure wherein the inner shroud section comprises a plurality of circumferential segments having radially inwardly directed stems connected to an annular flange at said nozzle supporting end of the tubular heat dissipating body; and to provide such a structure in combination with thermal insulating means for restricting heat flow from said stems to said flange.

Other objects of this invention will appear in the following description and appended claims, reference being had to the accompanying drawings forming a part of this specification wherein like reference characters designate corresponding parts in the several views.

Figure 1:
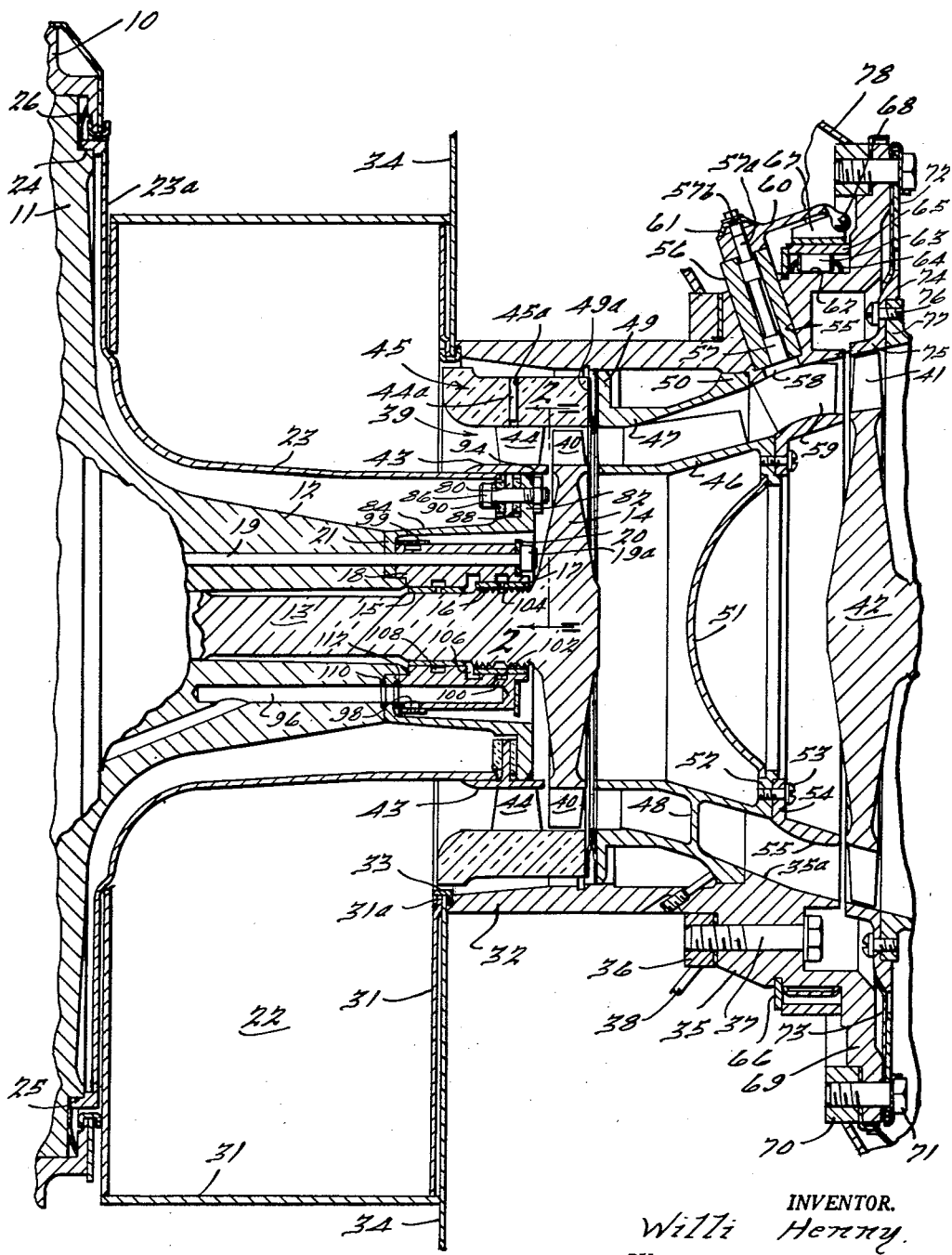
FIGURE 1 is a fragmentary mid-sectional view through the rotors of a gas turbine engine embodying the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to the drawings, portions of an automotive gas turbine engine embodying the present invention are illustrated including a fixed frame member 10 of the engine's compressor-diffuser assembly. A compressor-diffuser wall 11 of a compressor housing, which may comprise an aluminum alloy casting, is suitably mounted on the frame member 10. A central annular hub 12 integral with the casting 11 provides support for the shaft 13 of a first stage turbine rotor 14. An annular ported bushing 15 for shaft 13 is spaced from the rotor 14 by a suitable labyrinth seal 16 enclosed within a ported annular sleeve 17. An annular bearing support 18 encloses the bushing 15 and sleeve 16 in supporting relation and is secured to the right end wall of hub 12 by a plurality of axially extending tie bolts 19. An annular washer 20 is provided between the enlarged heads 19a of the bolts 19 and the right face of support 18. An annular pilot flange 21 to be described in more detail below is interposed between the support 18 and a radial pilot shoulder comprising the end wall of the hub 12, the latter, support 18, washer 20, and flange 21 being positively secured together in axially stacked heat transfer relationship by the bolts 19.

The left end of the shaft 13 is suitably connected with a compressor rotor which supplies high pressure combustion supporting air that is eventually discharged from a combustion chamber into a spiral collecting chamber 22 defined in part by an annular sheet metal inner wall 23 which flares radially outwardly at 23a and terminates in an annular retaining flange 24 overlying a shoulder 25 of the compressor diffuser wall 11. An annular resilient seal 26 confined between the wall 11 and flange 24 extends radially outwardly from the latter and resiliently presses against an overlapping portion of the frame 10 to complete a fluid tight seal therewith. The wall 23 also extends coaxially around the shields, the hub 12 and bearing support 18 from the hot motive gases in chamber 22.

The spiral chamber 22 is completed by an outer wall 31 formed by sheet metal parts welded together. The right inner edge of wall 31 terminates in an axially offset portion 31a spaced radially from wall 23 and is secured to a fixed nozzle block 32 by means of an annular channel-shaped retainer 33. A portion of the combustion chamber wall 34 is also illustrated adjacent the right edge of chamber 22 and confined against flange 31a by retainer 33. An intermediate portion of the block 32 comprises an annular enlarged boss 35 which is secured to a fixed annular engine frame member 36 by a plurality of bolts 37. A fragmentary portion of a bulkhead 38 welded to the ring 36 is illustrated, the bulkhead 38 being also secured to fixed portions of the engine frame to support the nozzle block 32.

The retaining ring 33 defines the opening of an annular gas passageway 39 which conveys the hot motive gases from the collecting chamber 22 axially of the rotor 14 to the latter's peripheral blades 40 and thence to the peripheral blades 41 of a second stage rotor 42. The latter may be connected by speed reducing gears to the driving wheels of the vehicle.

The passage 39 is formed by a number of annular inner and outer shroud sections including an inner shroud section comprising a plurality of circumferentially extending shroud segments 43 having their left hand edges closely overlapping the right hand annular edges of the wall 23 in sliding relationship and having their right edges arranged in juxtaposition with the rotor 14 at the base of the blades 40. Each shroud segment 43 carries a number of integral radially extending fixed nozzles 44, the latter being uniformly spaced circumferentially within the annular chamber 39 immediately in advance of the blades 40 to direct the motive gases thereto. An outer shroud section 45 is supported on the radial outer ends of the nozzles 44 and closely overlies the periphery scribed by the blades 40. A radial pin 44a integral with each nozzle 44 extends from the latter's outer end into a mating radial bore 45a in shroud 45 for mutually supporting the blades and shroud and for keying the latter against axial movement.

The portion of the passage 39 to the right of rotor blades 40 includes inner and outer intermediate annular shroud sections 46 and 47 respectively, spaced radially by connecting webs 48. The outer intermediate shroud section 47 is provided with left and right annular flanges 49 and 50 which seat firmly against mating portions of the inner surface of the nozzle block 32, the flange 49 being also spaced from the left edge of shroud 45 by an annular V-seal 49a. A dished baffle 51 closes the inner opening of the inner shroud section 46 and is secured around its periphery to an annular inturned flange 52 of the shroud section 46, the flange 52 being secured by bolts 53 to a mating flange 54 of an annular inner shroud section 55 cooperating with the shroud section 46 to comprise a continuation of the inner wall of passage 39 and terminating at its right edge adjacent the rotor 42 at the base of the blades 41. A portion of the interior surface 35a of boss 35 comprises an annular outer shroud section continuous with the shroud section 47 and extending around the inner shroud section 55 in radially spaced relation.

The boss 35 is provided with a plurality of circumferentially spaced bores 55 arranged in the plane of a conical envelope around the axis of the rotors 14 and 42 and perpendicular to the adjacent conically enlarging portion of the passage 39. A tubular bushing 56 snugly pressed within each bore 55 provides a journal for a spindle 57 having an enlarged annular sealing flange 58 at its radially inner end engaged with the inner end of the bushing 56. Secured to the radially inner end of each spindle 57 is an adjustable nozzle 59 which is pivotally adjustable within the passage 39 immediately in advance of the blades 41 so as to adjust the angle of attack of the motive gases thereto. An outer portion 57a of each spindle is splined to the hub of one of each of a corresponding plurality of swinging arms 60. A C-shaped Belleville type washer 61 is suitably secured within a reduced neck portion 57b of each spindle 57 outwardly of the hub of its associated arm 60 and is under spring tension yieldingly urging the latter inwardly and the spindle 57 outwardly so as to urge the annular seal 58 into fluid sealing engagement with the inner face of the bushing 56. To the right of the bores 55, the boss 35 comprises a cylindrical bearing platform 62 coaxial with the rotors 14 and 42. Several rollers 63 are uniformly spaced circumferentially around the cylindrical surface 62 and are retained in their spaced relationship by means of an annular bearing race 64. Rotatable on the rollers 63 is a ring 65 which is retained against leftward axial displacement by a C-shaped spring retainer 66 partially embedded within the boss 35.

Swinging of the arms 60 associated with the spindles 57 and adjustable nozzles 59 is accomplished by a plurality of axially extending guide channels, one for each arm 60. Each guide channel is defined by a pair of parallel plates 67 extending outward in axial planes from the ring 65 and secured thereto and closely confining a ball end 68 of one of each of the swinging arms 60 therebetween. Thus upon selective rotation of ring 65, the arms 60 and nozzles 59 are pivotally adjusted in unison about the axes of their associated spindles 57.

Rightward displacement of ring 65 is prevented by a radial flange 69 of boss 35 which is secured to a fixed annular portion of the engine frame 70 by a plurality of bolts 71. An annular backup plate 72 is also secured to the flange 69 by the bolts 71 and retains the outer portion of an annular resilient seal 73 in position. The latter extends radially inwardly and overlies the left face of a radial flange 74 of an outer shroud section 75 closely overlying the peripheral edges of the blades 41. Flange 74 is secured by bolts 76 to an outer annular shroud section 77 comprising a continuation of the shroud section 75 and being in turn supported by fixed portions of the engine frame. Also illustrated is a portion of a sheet metal bulkhead 78 welded to annular frame member 70 to secure the latter to other fixed portions of the engine frame. Reference may be had to applicant's copending application Serial No. 34,172, filed June 6, 1960, now Patent No. 3,089,679, for further details of the shroud and nozzle structure downstream of the rotor 14, described thus far.

Figure 2:
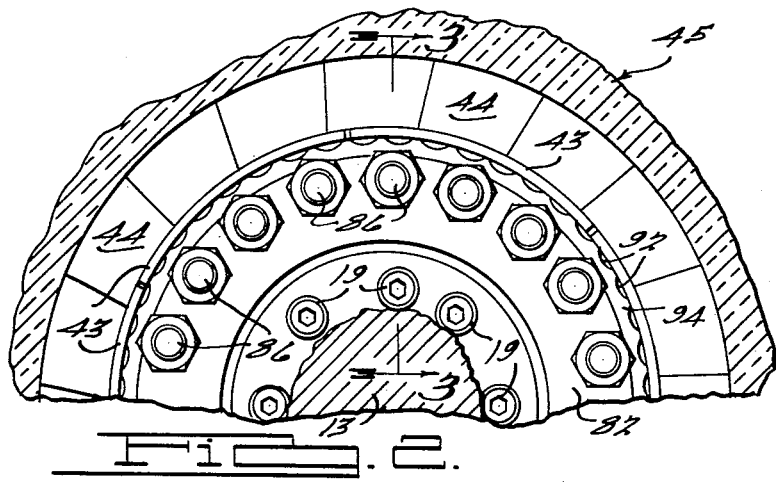
FIGURE 2 is a transverse sectional view taken in the direction of the arrows substantially along the line 2—2 of FIGURE 1.
Figure 3:
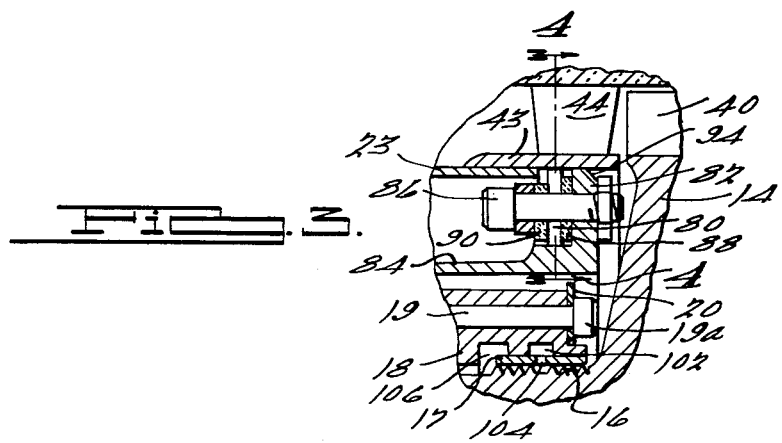
FIGURE 3 is a fragmentary sectional view taken in the direction of the arrows substantially along the line 3—3 of FIGURE 2.
Figure 4:
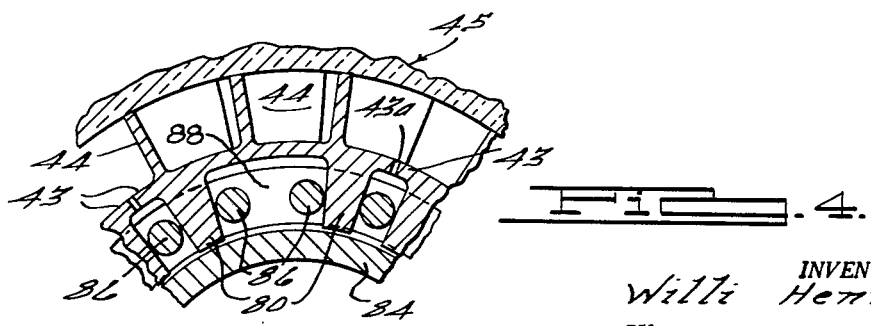
FIGURE 4 is a fragmentary sectional view taken in the direction of the arrows substantially along the line 4—4 of FIGURE 3.

Referring in more particularity to FIGURES 2, 3, and 4, details of the support for the fixed nozzles 44 are illustrated. Each circumferentially extending inner shroud segment 43 is provided with several integral circumferentially spaced stems 80 which extend radially inwardly and are secured to an annular nozzle supporting flange 82 of an integral tubular heat dissipating body 84 by a plurality of bolts 86. Thermal insulating gaskets 88 and 90 are interposed between flange 82 and the stems 80 and also between the latter and the heads of bolts 86 to minimize heat transfer from the stems 80 to the supporting flange 82. Also for the purpose of minimizing heat transfer from the shroud segments 43 to the supporting flange 82, the latter is scalloped at 92 around its outer periphery and is provided with a peripherally extending chamfer 94 to minimize the area of contact between flange 82 and the shroud segments 43.

In order to direct the motive gases at the desired angle against the rotor blades 40, the radially extending fixed nozzle blades 44 are biased from rear to front in FIGURE 4 with respect to the axis of rotor 14. Similarly the circumferential ends of the segments 43 are biased from rear to front and are provided with a slight circumferential spacing 43a therebetween to enable thermally induced expansion during operation.

In order to attain efficient operation of the engine, it is essential to maintain the minimum clearance between the blades 40 and outer shroud 45 required to prevent binding between these parts. The outer shroud 45 is formed of comparatively low expansion metal or ceramic designed to match the radial thermal expansion of rotor 14. The latter on the other hand has the comparatively cool central shaft 13 which restrains radial expansion of its hotter outer periphery exposed to the hot motive gases. The outer periphery thus tends to expand less than similarly heated portions having no appreciable radial thermal gradient, as for example the annular nozzle support 82. The present construction reduces the thermal expansion of support 82 by providing such means as the gaskets 88 and 90, the scalloped periphery 92, and chamfer 94 for reducing heat transfer to the nozzle supporting flange 82. In addition the tubular heat dissipating body 84 arranged coaxially with rotor 14 conducts heat axially from the flange 82 to maintain the latter's temperature at a reduced level with respect to the temperature of the shroud segments 43 and outer periphery of the rotor 14. In consequence, the radial thermal expansion and contraction of flange 82 can be readily matched with the corresponding expansion and contraction of the outer periphery of the rotor 14 by suitably predetermining the length and wall thickness of the tubular body 84.

As the flow of motive gases in conduit 39 approaches the speed of sound, i.e, sonic velocity, the dimensional relationship between the fixed nozzles 44 and rotor blades 40 must be precisely maintained in order to prevent a marked drop in operating efficiency. Not only must the hot outer flange 82 of the nozzle support body 84 expand and contract with the outer rim of the rotor 14 which supports the blades 40, but the angular relationship of the shroud segments 43, as for example, with respect to the axis of rotation, must be maintained substantially constant with respect to the corresponding angular relationship of the aforesaid rim of rotor 14. In addition to the considerations described above, such relationships are depedent upon the stability of the piloted seating of flange 21 against the radial pilot shoulder of bearing hub 12.

It is apparent that the less the temperature differential between the pilot flange 21 and the mating pilot shoulder of the bearing hub 12, the more stable will be the flange 21 seated at the pilot shoulder. In other words, the more the pilot flange 21 is cooled toward the temperature of the mating pilot shoulder, the less will be the thermal distortion of the flange 21 on the hub 12, the less likely will the flange become loose or lose its piloted seating on hub 12, and the more positively will the flange 82 and shroud sections 43 be supported. In addition, the less the temperature gradient along the conical nozzle support body 84, the less will be the thermally induced stresses at flanges 21 and 82 resulting from changes in the conical angle of support 84, i.e. the angle between the support 84 and the axis of rotor 14, and the less will be the force tending to bend the flanges 21 and 84 out of their radial positions shown.

It is apparent that the requirements to maintain flange 21 cool and to maintain a suitable axial temperature gradient in support 84 are both served by controlling the axial length and wall thickness of support 84. For example, the longer and thinner the support 84, the greater will be its resistance to heat flow axially from the hot flange 82 toward the cooler flange 21 and the cooler will be the latter flange, all other conditions being equal, and also for any given increment of radial expansion of flange 82 with respect to the radial expansion of flange 21, the less will be the change in the conical angle of support 84. For these reasons, the axial length of support 84 is as long as feasible and at a minimum is sufficiently long to restrict the heat flow therein toward flange 21, so that the temperature of the latter will be mainained at approximately the temperature of the adjacent pilot shoulder of hub 12 during operation of the engine at maximum load. Conversely, the shorter the axial length for support 84, the greater must be the strength at the junctures between the support 84 and the flanges 21 and 82. For an automotive engine which necessarily employs a rotor 14 of as small a diameter as possible and wherein the operating temperature at flanges 21 and 82 are of the magnitudes of 600° F. and 1200–1500° F. respectively, the ratio of the axial length of support 84 to the radial distance between the inner diameter of the shroud segments 43 and the juncture between support 84 and flange 21 will preferably exceed 2:1, whereas a ratio of 1:1 is entirely impracticable with materials presently available at competitive prices.

It is apparent that the axial length of the body 84 can be made as long as required in order to provide adequate area for dissipating heat conducted thereto from the flange 82 and to establish any desired axial temperature gradient along the length of the body 84. In addition, the integral flange 21 of the body 84 is maintained in heat exchange or transfer relationship with the comparatively cool hub 12 in order to conduct heat thereto. By virtue of the structure described, the inner periphery of the flange 82 is not directly connected with the comparatively cool bearing support 18, but is connected with the hub 12 by means of the tubular body 84 and flange 21. Accordingly, the radial temperature gradient in flange 82 is comparatively small and the latter is free to expand and contact substantially as an annulus of uniform temperature without suffering permanent deformation.

In order to facilitate control of the axial temperature gradient along the tubular heat dissipating body 84, cooling air may be supplied via duct 96 in the hub 12 and support 18 from a suitable source of pressurized air, as for example the discharge air from the engine compressor driven by shaft 13. The duct 96 communicates with an annular groove 98 in the outer wall of support 18, the groove 98 being covered by a ported sleeve 99 which discharges the cooling air into the space between the support 18 and the interior wall of tubular body 84. The cooling air then flows axially to the right along body 84, thence radially outwardly between supporting flange 82 and rotor 14 and into the annular passage 39 via the annular space between rotor 14 and the inner shroud segments 43.

Additional radially extending branch ducts 100 in the side wall of support 18 connect duct 96 with an annular groove 102 in the interior surface of support 18 at the region of sleeve 17. A plurality of holes 104 through sleeve 17 conducts the cooling air to the labyrinth seal 16, from which the air flows axially in opposite directions, either into the space between rotor 14 and flange 82 and thence into conduit 39 as aforesaid, or into an annular drain groove 106 in the interior surface of support 18 and which discharges into a suitable oil reservoir by means of a duct in hub 12 and support 18 similar to duct 96. Also lubricating oil is conducted to the ported bushing 15 by means of an annular groove 108 in the inner surface of support 18 confronting bushing 15, the groove 108 being connected with a pressurized oil supply by means of a duct in hub 12 and support 18 similar to duct 96. In order to facilitate axial conduction of heat from support 18 to hub 12, metallic heat conducting annular sealing rings are provided around the various ducts in hub 12 and support 18 at their juncture with the flange 21, as for example the annular seals 110 and 112 provided for duct 96 which also extends through flange 21.

I claim:

1. In a gas turbine engine, a rotor having a coaxial shaft and a plurality of peripheral blades, passage means for conducting hot motive gases to said blades to drive said rotor, a plurality of flow directing nozzles in said passage means adjacent said rotor and spaced around its axis of rotation, a bearing support, a bearing carried by said support and having said shaft journaled therein, said support having a pilot portion proximate said bearing and in the region of said support having an operating temperature comparable to the operating temperature of said bearing, said passage means having inner and outer shroud means spaced by said nozzles, said inner shroud means being secured to said nozzles to support the same, heat dissipating means for supporting said inner shroud means in predetermined spatial relationship with respect to said rotor blades comprising supporting means secured at one end to said inner shroud means, said supporting means extending axially of said rotor from said one end and terminating in a pilot portion seated at the first named pilot portion of said bearing support in heat transfer relationship therewith, means for urging said seated pilot portion into predetermined spatial relationship with respect to the other pilot portion, means for maintaining said bearing support at a comparatively low temperature with respect to the temperature of said motive gases and for maintaining an appreciable temperature differential between said one end and seated pilot portion including means for shielding said bearing support and supporting means from said hot motive gases, the axial length of said supporting means being appreciably greater than its radial thickness and being determined to maintain a comparatively shallow temperature gradient along its length and to appreciably retard the heat flow from said one end to said first named pilot portion.

2. In the combination according to claim 1, said first named pilot portion including a radial shoulder, and the pilot portion of said supporting means including a radial flange seated against said shoulder, and said supporting means extending from the radial outer edge of said flange toward said one end an axial distance more than twice the radial distance from said radial edge to said inner shroud means.

3. In the combination according to claim 1, said supporting means and both pilot portions extending annularly around the axis of said rotor, and the axial length of said supporting means being at least comparable to the radial distance from said bearing to said inner shroud means.

4. In the combination according to claim 3, thermal insulating means arranged to retard heat flow from said inner shroud means to said supporting means.

References Cited in the file of this patent

UNITED STATES PATENTS

| | | |
|---|---|---|
| 2,296,702 | Butler et al. | Sept. 22, 1942 |
| 2,445,661 | Constant et al. | July 20, 1948 |
| 2,488,867 | Judson | Nov. 22, 1949 |
| 2,657,901 | McLeod | Nov. 3, 1953 |
| 2,741,455 | Hunter | Apr. 10, 1956 |
| 2,795,928 | Huebner et al. | June 18, 1957 |
| 2,972,230 | Conklin et al. | Feb. 21, 1961 |

FOREIGN PATENTS

| | | |
|---|---|---|
| 443,797 | Italy | Jan. 3, 1949 |
| 652,150 | Great Britain | Apr. 18, 1951 |